(12) United States Patent
Saporetti et al.

(10) Patent No.: US 11,477,862 B2
(45) Date of Patent: Oct. 18, 2022

(54) OPTICAL SYSTEM AND INDUCTION HOB COMPRISING AN OPTICAL SYSTEM

(71) Applicant: ELECTROLUX APPLIANCES AKTIEBOLAG, Stockholm (SE)

(72) Inventors: Marco Saporetti, Forli (IT); Jochen Holzinger, Rothenburg ob der Tauber (DE); Jennifer Burkhardt, Rothenburg ob der Tauber (DE); Michael Herzog, Rothenburg ob der Tauber (DE); Peter Negretti, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 476 days.

(21) Appl. No.: 16/500,919

(22) PCT Filed: Mar. 26, 2018

(86) PCT No.: PCT/EP2018/057642
§ 371 (c)(1),
(2) Date: Oct. 4, 2019

(87) PCT Pub. No.: WO2018/184892
PCT Pub. Date: Oct. 11, 2018

(65) Prior Publication Data
US 2020/0128630 A1    Apr. 23, 2020

(30) Foreign Application Priority Data
Apr. 7, 2017  (EP) ..................... 17165508

(51) Int. Cl.
*F21V 8/00* (2006.01)
*H05B 6/12* (2006.01)

(52) U.S. Cl.
CPC ........... *H05B 6/1218* (2013.01); *G02B 6/001* (2013.01); *G02B 6/0006* (2013.01); *H05B 2206/022* (2013.01)

(58) Field of Classification Search
CPC ............ H05B 6/1218; H05B 2206/022; G02B 6/0006; G02B 6/001
(Continued)

(56) References Cited

U.S. PATENT DOCUMENTS

2021/0251052 A1*  8/2021  Negretti ............... H05B 6/1218
2021/0360751 A1*  11/2021  Bayerlein ............ H05B 6/1245

FOREIGN PATENT DOCUMENTS

DE    102017211798 A1 *  1/2019  .......... G02B 6/0006
EP    2405713 A1    1/2012
(Continued)

OTHER PUBLICATIONS

International Search Report and Written Opinion in PCT/EP2018/057642 dated Jun. 13, 2018, 10 pages.

*Primary Examiner* — Laura K Tso
(74) *Attorney, Agent, or Firm* — Pearne & Gordon LLP

(57) ABSTRACT

The invention relates to an optical system for an induction cooking device with at least one induction coil (2) and an at least partially transparent or semi-transparent top plate (3), the optical system (10) comprising at least one light source (11) to be arranged in a central area of said induction coil (2) in order to provide light through a central opening (2.1) of said induction coil (2), light deflecting means (12) configured to receive light from the light source (11) and provide said light at one or more openings (12.1) and light guiding means (13) for guiding light provided at said one or more openings (12.1) in an area between the upper side of the induction coil (2) and the lower side of the top plate (3), said light guiding means (13) being configured to guide the light into a space between the induction coil (2) and the top plate (Continued)

(3) and provide a light indicator at the top side of the top plate (3).

20 Claims, 3 Drawing Sheets

(58) Field of Classification Search
USPC .......................................... 362/92; 219/622
See application file for complete search history.

(56) References Cited

FOREIGN PATENT DOCUMENTS

| EP | 2648478 A1 | 10/2013 |
|---|---|---|
| FR | 2827114 A1 | 1/2003 |
| JP | 2014116088 A | 6/2014 |
| WO | WO2013149792 A1 | 10/2013 |

* cited by examiner

OPTICAL SYSTEM AND INDUCTION HOB COMPRISING AN OPTICAL SYSTEM

The present invention relates generally to the field of induction hobs. More specifically, the present invention is related to an optical system for providing light indicators at the top plate of an induction hob.

BACKGROUND OF THE INVENTION

Induction hobs for preparing food are well known in prior art. Induction hobs typically comprise at least one induction coil placed below a top plate in order to heat a piece of cookware. In widely used configurations, said top plate is transparent or semi-transparent and may be made of glass-ceramic material.

European Patent Application EP 2 648 478 A1 discloses an illumination device for a cooking hob. The cooking hob comprises a cooking zone element with a central cut-out below which said illumination device is arranged in order to illuminate the centre portion of a cooking zone heated by said cooking zone element.

However, said known technical solution is disadvantageous because based on the central light indicator, the size and extent of the cooking zone element is not derivable.

SUMMARY OF THE INVENTION

It is an objective of the embodiments of the invention to disclose an optical system which provides light indicators with enhanced information content in order to improve the usability of the induction hob. If not explicitly indicated otherwise, embodiments of the invention can be freely combined with each other.

According to an aspect, the invention relates to an optical system for an induction cooking device with at least one induction coil and an at least partially transparent or semi-transparent top plate. The optical system comprises at least one light source to be arranged in a central area of said induction coil in order to provide light through a central opening of said induction coil, light deflecting means configured to receive light from the light source and provide said light at one or more openings and light guiding means for guiding light provided at said one or more openings in an area between the upper side of the induction coil and the lower side of the top plate. Said light guiding means are configured to guide the light into a space between the induction coil and the top plate and provide a light indicator at the top side of the top plate.

The light deflecting means may comprise one or more reflective portions in order to change to the propagation direction of light. The light deflecting means may comprise a portion (e.g. an opening) for receiving light from the light source and one or more further openings for providing light towards the light guiding means. The light deflecting means may be formed by a light deflecting entity arranged above the light source and in the centre of the light guiding means.

The light source may be arranged below the plane in which the induction coil is arranged. The light deflecting means may be adapted to guide the light in the vertical direction such that light is provided at said one or more openings in a horizontal or essentially horizontal direction and in an area between the upper side of the induction coil.

Said optical system is advantageous because based on the light guiding means, light indicators can be provided at a portion of the top plate directly above the windings of the induction coil, i.e. not or not only in the area of a central opening or cut-out of the induction coil but at a position being arranged at a radial distance to said central opening or cut-out below which the induction coil is arranged. Thereby, the usability of the induction hob can be significantly increased.

According to embodiments, said light guiding means comprise one or more light guides to be arranged between the upper side of the induction coil and the lower side of the top plate. By means of said light guides, a locally limited light propagation in the space between the lower surface of the top plate and the upper surface of the induction coil can be obtained. In case that said space comprises thermal insulation material, said light guides can be arranged in recesses or cut-outs of said insulation material.

According to embodiments, each light guide is optically coupled with one opening of said light deflecting means. Preferably, a free end of the light guide may be arranged in close proximity to the opening of said light deflecting means. Thereby, light emitted at the opening may couple into said light guide and may propagate within said light guide from an inner peripheral area of the induction coil in the direction to an outer peripheral area of the induction coil.

According to embodiments, said light guide comprises a rectangular, bar-shaped light conducting element. Said light conducting element may be made of glass or any other transparent, light-guiding material. Because of the arrangement of the light guide between the upper side of the induction coil and the lower side of the top plate, the light guide may be made of a heat-resistant material, specifically a material designed for a heat impact of 250° C. or more, specifically 300° C. or more.

According to embodiments, the light conducting element comprises a glazed, sandblasted or coated top surface to be oriented towards the top plate. Based on said glazed, sandblasted or coated top surface light diffusion may be achieved in order to obtain a uniform or essentially uniform distribution of light across the m cross section of the light guide.

According to embodiments, the light conducting element comprises a white or light-reflecting coating at the lower surface to be oriented towards the induction coil. Thereby, light propagating through the light conducting element is confined within said light conducting element and leaky out-coupling of light at the lower surface can be avoided. Similarly, lateral surfaces extending between said upper and lower surface may also comprise such white or light-reflecting coating in order to further enhance light confinement.

According to embodiments, said light guide comprises at least an upper and a lower light guide entity. So, in other words, light is not guided based on a single-piece light guiding element but said light guide comprises two or more elements which interact for achieving said light guiding.

According to embodiments, said upper light guide entity is a rectangular bar-shaped light conducting element, preferably a rectangular bar-shaped light conducting element comprising a sandblasted or coated top surface to be oriented towards the top plate. Said light conducting element may be made of glass or any other transparent, light-guiding material which may be made of a heat-resistant material, specifically a material designed for a heat impact of 250° C. or more, specifically 300° C. or more.

According to other embodiments, said upper light guide entity is build by a glazed or sandblasted portion of the top plate. So, in other words, the top plate itself builds an integral part of the light guide, specifically forms the upper light guide entity of a multi-piece light guide. Thereby the effort for forming the light guides can be significantly reduced.

According to embodiments, said lower light guide entity is a light guide channel with a base portion and a pair of side wall portions protruding upwardly from said base portion, specifically a light guide channel with a U-shaped cross section. Said light guide channel may confine the light guide at a lower boundary and ensure light propagation within the light guide based on multiple reflections.

According to embodiments, said lower light guide entity comprises a white or light reflecting coating at a bottom portion or is made of a white or light-reflective material. Thereby, light propagation within the light guide based on multiple reflections is achieved.

According to embodiments, the bottom portion of said one or more light guides is slanted with respect to the top plate. Preferably, said slanting may be obtained by a tapered light guide, i.e. the height of the light guide may change along its longitudinal direction. For example, said slanting may be a linear slanting. Alternatively, said slanting may be obtained by stepwise tapering. Preferably, the higher portion of the light guide may be arranged at or close to the edge of the central coil opening in order to arrange the greater interface of the light guide close to the light source thereby improving the coupling efficiency into the light guide.

According to embodiments, said light guiding means comprise multiple, specifically three light guides radially extending from said light deflecting means. Thereby the size, extent and/or centre of the induction coil can be recognized by the user with reduced technical effort.

According to embodiments, said light deflecting means comprise a disk-shaped deflection portion which blocks a direct transmission of light towards a top plate portion arranged above said light source. Thereby, light provided by the light source can be effectively provided to said light guiding means in order to provide light indicators at a radial distance to said disk-shaped deflection portion.

According to other embodiments, said disk-shaped deflection portion may comprise one or more openings through which light is emitted towards the top plate in order to additionally provide a light indicator in the central portion of the induction coil.

According to embodiments, said light deflecting means comprise a cone-shaped deflection portion arranged above said light source, wherein a tip of said cone-shaped deflection portion is directed towards said light source. Said cone-shaped deflection portion may interact with the disk-shaped deflection portion and an outer wall of the light deflecting means in order to concentrate the light propagation from the light source towards the one or more openings provided at said light deflecting means.

According to a further aspect, the invention relates to an induction cooking device with at least one induction coil and an at least partially transparent or semi-transparent top plate.

The induction cooking device comprises an optical system according to anyone of the upper-mentioned embodiments.

The term "essentially" or "approximately" as used in the invention means deviations from the exact value by +/−10%, preferably by +/−5% and/or deviations in the form of changes that are insignificant for the function.

BRIEF DESCRIPTION OF THE DRAWINGS

The various aspects of the invention, including its particular features and advantages, will be readily understood from the following detailed description and the accompanying drawings, in which.

DETAILED DESCRIPTION OF PREFERRED EMBODIMENTS

Figure 1:
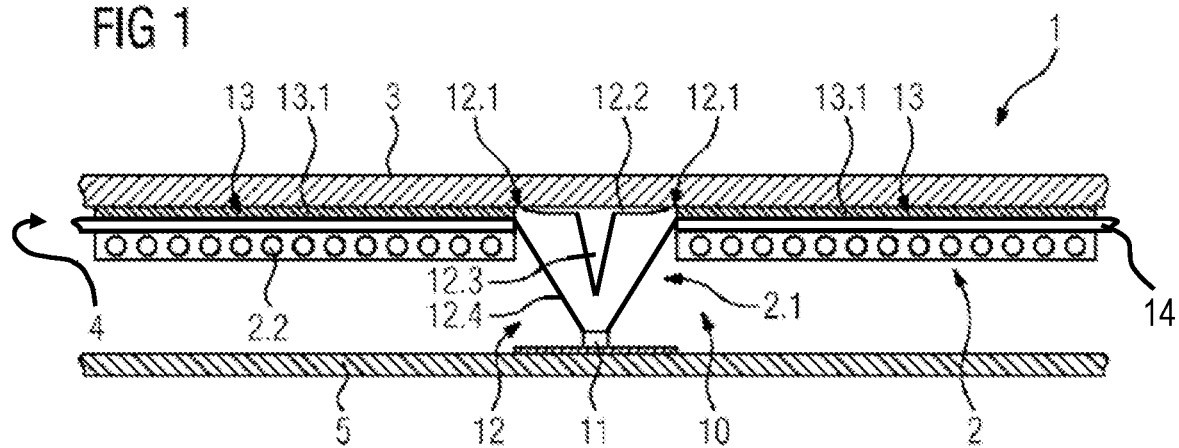
FIG. 1 shows an example embodiment of an induction hob comprising an optical system according to the present invention based on a lateral sectional view.

The present invention will now be described more fully with reference to the accompanying drawings, in which example embodiments are shown. However, this invention should not be construed as limited to the embodiments set forth herein. Throughout the following description similar reference numerals have been used to denote similar elements, parts, items or features, when applicable.

FIG. 1 shows a schematic diagram of an induction cooking device 1, specifically an induction hob. The induction hob 1 comprises an at least partially transparent or semi-transparent top plate 3 (e.g. a glass-ceramic plate), below which one or more induction coils 2 are arranged in order to form a cooking zone at the induction hob 1. The induction coil 2 may be a ring-shaped coil with an opening 2.1 or cut-out provided in the centre of the induction coil 2. The induction coil 2 may comprise multiple windings 2.2 which are arranged around said opening 2.1.

In order to provide one or more light indicators at the top plate 3, an optical system 10 is provided. The optical system 10 comprises a light source 11 which provides light in the wavelength region visible by humans. The light source 11 may comprise, for example, a light emitting diode (LED) or a light bulb. Depending on the required light intensity, the light source 11 may comprise one or more LEDs or light bulbs. The light source 11 may rest on a support portion 5 of the induction cooking device 1.

The light source 11 may be arranged in the area of the opening 2.1 of the induction coil 2. Advantageously, the light source 11 may be arranged in the centre or essentially in the centre of the opening 2.1 of the induction coil 2. In order to reduce the heat impact on the light source 11, the light source 11 is arranged below the induction coil 2, specifically, the light source 11 is arranged below the plane of the windings 2.2 of the induction coil 2 at a vertical distance to the lower surface of the induction coil 2.

The light source 11 may be adapted to emit light upwardly towards the opening 2.1 of the induction coil 2. Said light source 11 is optically coupled with light deflecting means 12. Said light deflecting means 12 are configured to change the propagation direction of light provided by said light source 11. More in detail, said light deflecting means 12 may be adapted to prevent a direct light transmission from the light source 11 to the top plate 3, i.e. may prevent the provision of a light indicator directly above the opening 2.1 of the induction coil 2. Said light deflecting means may be adapted to change the light propagation direction from a vertical or essentially vertical direction into a horizontal or essentially horizontal direction and provide said re-directed light at one or more openings 12.1. Said openings 12.1 may be arranged at a height-level of the space 4 provided between the top surface of said induction coil 2 and the lower surface of the top plate 3.

More in detail, the light deflecting means 12 may comprise an outer wall portion 12.4. The interior space provided within the outer wall portion 12.4 may widen upwardly. For example, the outer wall portion 12.4 may comprise a conical or essentially conical shape. At the lower side (which is the more narrow side) of the outer wall portion 12.4, said outer wall portion 12.4 is optically coupled with the light source 11. More in detail, at the lower side, the outer wall portion 12.4 comprises an opening through which light emitted by the light source 11 enters the interior space of the light deflecting means 12. Furthermore, said light deflecting means 12 comprise a disk-shaped deflection portion 12.2. Said disk-shaped deflection portion 12.2 may be arranged opposite to the light source 11 directly below or slightly spaced to the top plate 3. Said disk shaped deflection portion 12.2 may be adapted to the size of the opening 2.1 of the induction coil 2 and may preferably cover the whole or essentially the whole portion of the top plate 3 provided above said opening 2.1 in order to avoid a direct transmission of light from the light source 11 through the opening 2.1 to a top plate portion above said opening 2.1.

In addition, the light deflecting means 12 may further comprise a further deflection portion 12.3 which may comprise a conical shape. The tip of the cone-shaped deflection portion 12.3 may be directed to the light source 11 and the base portion of the cone-shaped deflection portion 12.3 may be arranged at or close to the disk-shaped deflection portion 12.2. Said further deflection portion 12.3 may be adapted to interact with the outer wall portion 12.4 such that light emitted by the light source 11 is guided to the opening 12.1 based on multiple reflections at the surfaces of the further deflection portion 12.3 and the outer wall portion 12.4. The inner surfaces of the light deflecting means 12 may be made of a highly light-reflective material or may comprise a highly light-reflective coating.

The light deflecting means 12 may be made of heat-resistant material, specifically heat-resistant for temperatures up to 300° C. and higher.

In order to provide the light indicators at an area of the top plate 3 above the induction coil 2, specifically at an area of the top plate 3 above the windings 2.2 of the induction coil 2, the optical system 10 further comprises light guiding means 13. Said light guiding means 13 may comprise one, preferably two or more light guides 13.1. The light guides 13.1 may be arranged in a space between the induction coil 2 and the top plate 3. Typically, within said space a thermal insulation material 14 is received in order to lower the heat impact on the induction coil 2. According to an embodiment, said thermal insulation material 14 may comprise one or more recesses, each recess receiving one or more light guides 13.1. The light guides 13.1 may be arranged parallel or essentially parallel to the top plate 3.

Figure 5:
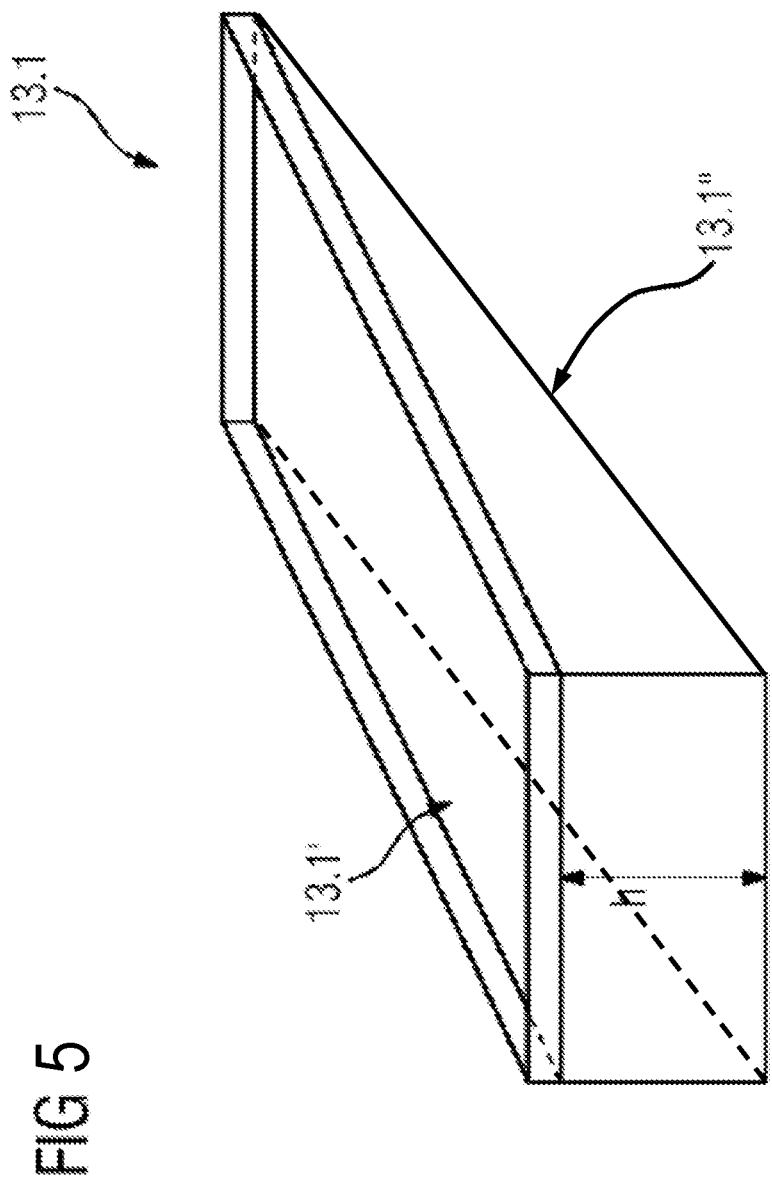
FIG. 5 shows an example further embodiment of a light guide to be included in an optical system according to the present invention.

Each opening 12.1 of said light deflecting means 12 may be optically coupled with a light guide 13.1. Thereby, light emit-ted at the opening 12.1 is provided into said light guide 13.1. Thereby, light propagates into the space between the induction coil 2 and the top plate 3. The light guide 13.1 may extend form an inner portion of the induction coil 2, specifically the peripheral edge of the opening 2.1 of the induction coil 2 towards the outer peripheral edge of the induction coil 2. According to embodiments, the light guide 13.1 may be radially arranged with respect to the centre of the induction coil 2. According to other embodiments, such as that shown in FIG. 5, the light guides 13.1 may be slanted with respect to the radial direction, e.g. by an acute angle. According to yet other embodiments, the light guides 13.1 may be not straight but may be bent.

Figure 2:
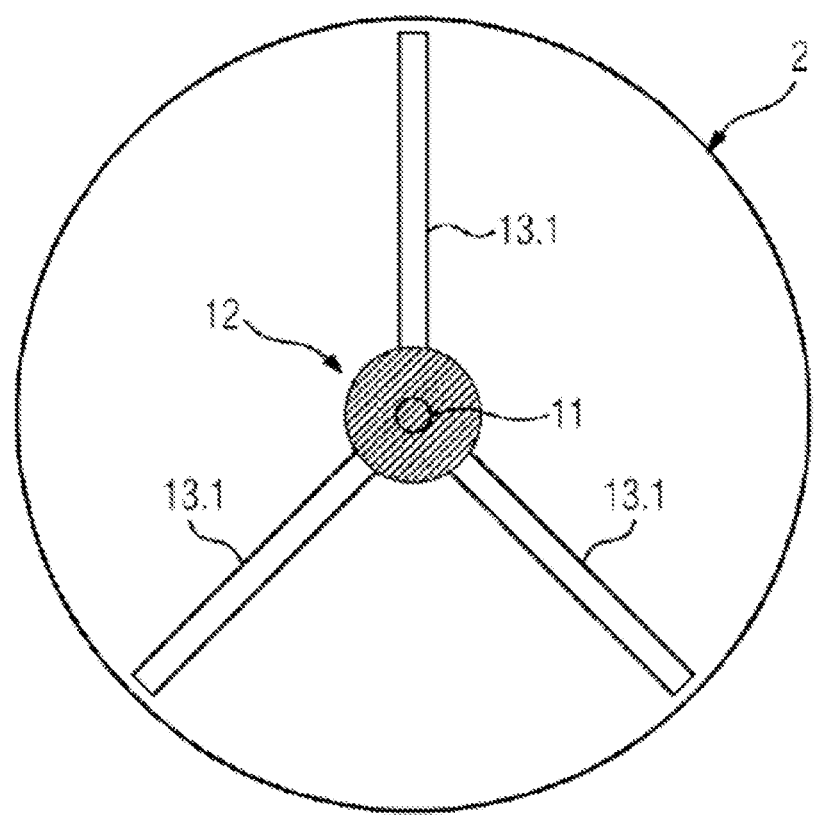
FIG. 2 shows an example embodiment of an optical system arranged above an induction coil based on a top view.

According to embodiments, as shown in FIG. 2, multiple light guides 13.1 may span over the induction coil 2. The light guides 13.1 may comprise a spoke-like arrangement being aligned towards the centre of the induction coil 2 and radially extending towards the outer peripheral edge of the induction coil 2. According to a preferred embodiment, the light guiding means 13 may comprise three light guides 13.1 which are angularly evenly distributed by an angle of 120° or essentially 120°. Light may be provided to the light guides 13.1 by a light source 11 and light deflecting means 12 arranged in the centre of the induction coil 2.

Figure 3:
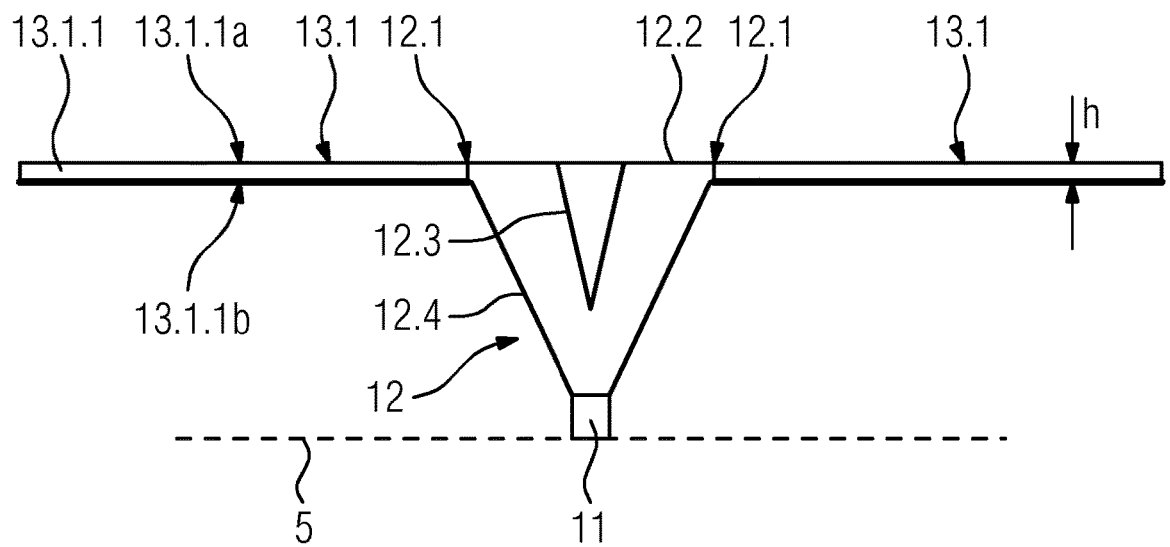
FIG. 3 shows an optical system with a first example embodiment of light guides being optically coupled with light deflecting means.
Figure 4:
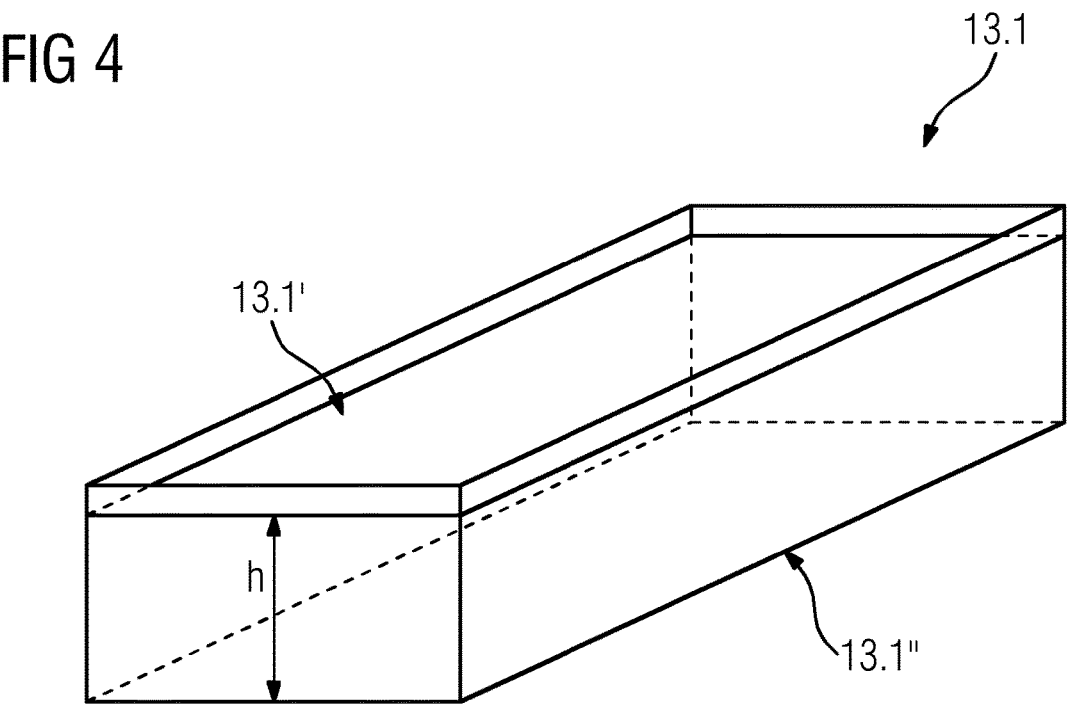
FIG. 4 shows an example further embodiment of a light guide to be included in an optical System according to the present invention.

FIGS. 3 and 4 show different embodiments of light guides 13.1. The light guide 13.1 according to FIG. 3 may be formed by a single-piece, bar-shaped light conducting element 13.1.1. The light conducting element 13.1.1 may be made of a heat-resistant material, specifically heat-resistant for temperatures up to 300° C. or higher. For example, the light conducting element 13.1.1 may comprise a lower surface 13.1.1*b* with a light-reflective coating. For example, the light-reflective coating may be provided by a reflective, mirror-like layer or a white layer. Similarly, also the radially extending side portions may comprise such layer or coating. In addition, according to embodiments, also the outer side portion (which is arranged opposite to the opening 12.1 of the light deflecting means 12) may comprise such layer or coating. Thereby, the light conducting element 13.1.1 may effectively guide light with reduced losses.

The top surface 13.1.1*a* may be adapted to provide an evenly distributed light indicator at the top plate 3. For example, the light conducting element 13.1.1 may comprise a glazed top surface 13.1.1*a*. For example, said top surface 13.1.1*a* may be sand blasted, corroded based on a acid process. Alternatively, said top surface 13.1.1*a* may be silk-printed. The glazed surface serves as light diffractor/diffusor. Said top surface 13.1.1*a* may directly abut at the lower surface of the top plate 3 or may be arranged in close proximity to said lower surface of the top plate 3.

FIG. 4 shows a light guide 13.1 according to a further embodiment. The light guide 13.1 is formed by an upper light guide entity 13.1' and a lower light guide entity 13.1". The light guide 13.1 may comprise an interior space which is enclosed by the upper light guide entity 13.1' and the lower light guide entity 13.1". The light provided through the opening 12.1 of the light deflecting means 12 may be guided by multiple reflections within said interior space. The lower light guide entity 13.1" may comprise a base portion and a pair of legs protruding upwardly from said base portion. For example, the lower light guide entity 13.1" may comprise an U-shaped cross section. The lower light guide entity 13.1" may be made of a highly light-reflective material or may comprise inner surfaces with a highly light-reflective coating, e.g. a white-coloured surface. The upper light guide entity 13.1' may be arranged on top of the lower light guide entity 13.1". More in detail, the upper light guide entity 13.1' may be arranged at the open upper side of the lower light guide entity 13.1". The upper light guide entity 13.1' may be a bar-shaped light conducting element, for example made of glass or another transparent material. The upper light guide entity 13.1' may comprise a glazed top surface (to be arranged at or close to the top plate 3). Said top surface may be, for example, sand blasted, corroded based on a acid process or silk-printed. The upper and lower light guide entity 13.1', 13.1" may be made of a heat-resistant material, specifically heat-resistant for temperatures up to 300° C. or higher.

According to further embodiments, the light guide 13.1 may only comprise said lower light guide entity 13.1" and may directly abut against the lower surface of the top plate 3. The top plate 3 may comprise a glazed or sand-blasted lower surface portion in the area at which the lower light guide entity 13.1" is arranged. By means of the glazed or sand-blasted lower surface portion, the upper light guide entity 13.1' can be omitted.

In order to further define the areas of the light indicators, the top plate 3 comprises a light mask. Said light mask may be coincide with the arrangement of the light guides 13.1 such that each light guide 13.1 is arranged directly below a transparent or semi-transparent stripe of said light mask. Said light mask may be configured to define transparent portions through which light can be provided in order to obtain well-defined boundaries of the light indicators.

The light guide 13.1, respectively, the lower light guide entity 13.1" may comprise an equal height h along the longitudinal direction of the light guide 13.1. According to other embodiments, such as that shown in FIG. 5, the light guide 13.1, respectively, the lower light guide entity 13.1" may comprise a tapered height along the longitudinal direction. More in detail, the height h of the light guide 13.1 may decrease from the inner end (arranged close to the light deflecting means 12) to the outer end of the light guide 13.1. Thereby, an even light distribution along the longitudinal direction of the light guide 13.1 can be obtained.

It should be noted that the description and drawings merely illustrate the principles of the proposed induction hob. Those skilled in the art will be able to implement various arrangements that, although not explicitly described or shown herein, embody the principles of the invention.

LIST OF REFERENCE NUMERALS

1 induction cooking device
2 induction coil
2.1 opening
2.2 winding
3 top plate
4 space
5 support portion
10 optical system
11 light source
12 light deflecting means
12.1 opening
12.2 disk-shaped deflection portion
12.3 cone-shaped deflection portion
12.4 outer wall portion
13 light guiding means
13.1 light guide
13.1' upper light guide entity
13.1" lower light guide entity
13.1.1 light conducting element
13.1.1a top surface
13.1.1b lower surface
h height

The invention claimed is:

1. Optical system for an induction cooking device with at least one induction coil and an at least partially transparent or semi-transparent top plate, the optical system comprising at least one light source to be arranged in a central area of said induction coil in order to provide light through a central opening of said induction coil, light deflecting means configured to receive said light from the light source and provide said light at one or more openings of said light deflecting means, and light guiding means for guiding the light provided at said one or more openings in an area between an upper side of the induction coil and a lower side of the top plate, said light guiding means being configured to guide the light into a space between the induction coil and the top plate and provide a light indicator at a top side of the top plate.

2. Optical system according to claim 1, wherein said light guiding means comprise one or more light guides to be arranged between the upper side of the induction coil and the lower side of the top plate.

3. Optical system according to claim 2, wherein each said light guide is optically coupled with one said opening of said light deflecting means.

4. Optical system according to claim 2, wherein said light guide comprises a rectangular bar-shaped light conducting element.

5. Optical system according to claim 4, wherein the light conducting element comprises a sandblasted or coated top surface to be oriented towards the top plate.

6. Optical system according to claim 4, wherein the light conducting element comprises a white or light-reflecting coating at its lower surface to be oriented towards the induction coil.

7. Optical system according to claim 2, wherein said light guide comprises at least an upper and a lower light guide entity.

8. Optical system according to claim 7, wherein said upper light guide entity is a rectangular bar-shaped light conducting element comprising a sandblasted or coated top surface to be oriented towards the top plate, or said upper light guide entity is built by a glazed or sandblasted portion of the top plate.

9. Optical system according to claim 7, wherein said lower light guide entity is a light guide channel with a base portion and a pair of side wall portions protruding from said base portion with a U-shaped cross section.

10. Optical system according to claim 7, wherein said lower light guide entity (13.1") comprises a white or light reflecting coating at a bottom portion or is made of a white or light-reflective material.

11. Optical system according to claim 2, wherein a bottom portion of said one or more light guides is slanted with respect to the top plate.

12. Optical system according to claim 1, wherein said light guiding means comprise multiple light guides radially extending from said light deflecting means.

13. Optical system according to claim 1, wherein said light deflecting means comprise a disk-shaped deflection portion which blocks a direct transmission of light towards a portion of said top plate arranged above said light source.

14. Optical system hob according to claim 1, wherein said light deflecting means comprise a cone-shaped deflection portion arranged above said light source, wherein a tip of said cone-shaped deflection portion is directed towards said light source.

15. Induction cooking device comprising:
at least one induction coils;
an at least partially transparent or semi-transparent top plate; and
an optical system comprising at least one light source to be arranged in a central area of said induction coil in order to provide light through a central opening of said induction coil, light deflecting means configured to receive said light from the light source and provide said light at one or more openings of said light deflecting means, and light guiding means for guiding the light provided at said one or more openings in an area between an upper side of the induction coil and a lower side of the top plate, said light guiding means being configured to guide the light into a space between the induction coil and the top plate and provide a light indicator at a top side of the top plate.

16. An induction hob comprising a top plate, an induction coil defining a center opening and being disposed beneath the top plate to define a heating zone thereof, a light source disposed beneath and being aligned with said center opening of said induction coil, light deflecting means arranged in said opening, a plurality of light guides in optical communication with said light deflecting means and extending horizontally over said induction coil in a space between an upper surface of said induction coil and a lower surface of said top plate, said light deflecting means being adapted to receive light from said light source and to redirect said light into said plurality of light guides so that said light propagates through said light guides in order to provide a visual indication visible from above and through said top plate of a radial extent of the cooking zone defined by said induction coil.

17. The induction hob according to claim 16, said light deflecting means comprising an outer wall defining an interior of said deflecting means and being optically coupled at a bottom opening thereof to said light source, and a plurality of lateral openings in said outer wall, each of said light guides being optically coupled to one of said lateral openings, an inverted conical deflector disposed centrally within said interior and adapted to deflect the light from said light source entering through said bottom opening toward and through said lateral openings and into said plurality of light guides.

18. The induction hob according to claim 17, each said light guide comprising a bottom surface reflective of visible light and an upper surface that has been sand-blasted or glazed on order to provide a uniform light-diffusing surface, said upper surface being provided adjacent to or in the lower surface of said top plate.

19. The induction hob of claim 18, further comprising thermal insulation in said space between the upper surface of said induction coil and the lower surface of said top plate, said plurality of light guides being received in recesses formed in said thermal insulation.

20. The induction hob according to claim 16, said light guides extending radially from said center opening and forming a spoke configuration over said induction coil.

* * * * *